United States Patent [19]

Bush et al.

[11] 4,280,888

[45] Jul. 28, 1981

[54] SCREEN PRINTABLE, UV CURABLE OPAQUE LEGEND INK COMPOSITION

[75] Inventors: Richard W. Bush, Columbia; Russell J. Jenkins, Woodstock, both of Md.; John E. Rie, Orange, Calif.

[73] Assignee: W. R. Grace & Co., New York, N.Y.

[21] Appl. No.: 120,803

[22] Filed: Feb. 12, 1980

Related U.S. Application Data

[63] Continuation-in-part of Ser. No. 842,182, Oct. 14, 1977, abandoned.

[51] Int. Cl.$^3$ .............................................. C08F 8/00
[52] U.S. Cl. .......................... 204/159.15; 204/159.18; 260/37 EP; 260/37 N; 260/42.21; 260/42.28; 260/42.38; 260/42.44; 260/42.49; 260/42.53; 427/44; 427/53.1; 427/54.1; 428/207; 430/292; 430/311; 526/224; 526/312
[58] Field of Search .................. 526/224, 312; 106/22; 204/159.15, 159.18; 427/53, 54; 260/42.21, 42.28, 42.34, 42.38, 42.37, 42.44, 42.53, 37 EP, 37 N, 42.49; 525/10, 28, 36, 44, 440, 435, 335, 922

[56] References Cited

U.S. PATENT DOCUMENTS

| 3,652,733 | 3/1972 | Davenport | 204/159.15 |
|---|---|---|---|
| 3,661,744 | 5/1972 | Kehr | 260/2.5 A |
| 3,701,721 | 10/1972 | Lard | 204/159.15 |
| 3,759,875 | 9/1973 | Guthrie | 106/22 |
| 3,787,303 | 1/1974 | Guthrie | 204/159.15 |
| 3,900,594 | 8/1975 | Guthrie | 260/837 R |
| 3,959,100 | 5/1976 | McGinniss | 427/464 |
| 4,024,296 | 5/1977 | Gruber | 427/53 |
| 4,089,825 | 5/1978 | Lawson | 427/54 |

Primary Examiner—J. Ziegler
Attorney, Agent, or Firm—Richard P. Plunkett; William W. McDowell, Jr.

[57] ABSTRACT

This invention relates to a screen printable, opaque legend ink composition curable on exposure to radiation, e.g., UV radiation in the presence of a photoinitiator or high energy ionizing radiation comprising (a) 15 to 40% by weight of an allyl terminated polyene which is the reaction product of an epoxide and an unsaturated amine, (b) 5 to 25% by weight of a cocurable allyl terminated polyene having a molecular weight of less than 500 selected from the group consisting of diallyl phthalate, triallyl isocyanurate, diallyl adipate, diallyl azelate, diallyl sebacate, diallyl itaconate, diallyl maleate, diallyl chlorendate, diallyl malate and triallyl cyanurate, (c) 15 to 45% by weight of a polythiol having a molecular weight in the range from about 94 to 20,000 of the general formula: $R_8$—$(SH)_n$ wherein $R_8$ is a polyvalent organic moiety free from reactive carbon-to-carbon unsaturation and n is at least 2 and (d) a pigment member of the group consisting of 0.5 to 25% by weight of zinc sulfide and 0.2 to 1.0% by weight of carbon black, said curable legend ink having a viscosity as measured on a Brookfield viscometer at 1 rpm using an RV7 spindle in the range 8,000 to 250,000 centipoises and a viscosity ratio at 1:10 rpm in the range 1.0 to 7.0.

6 Claims, No Drawings

SCREEN PRINTABLE, UV CURABLE OPAQUE LEGEND INK COMPOSITION

This application is a continuation-in-part of copending application having Ser. No. 842,182, filed Oct. 14, 1977, now abandoned.

This invention relates to a screen-printable opaque legend ink composition curable on exposure to radiation.

Legend or marking inks are applied to circuit boards usually to indicate proper positioning of components which are soldered or otherwise affixed thereto. Prior art legend inks include both the solvent type wherein only a portion of the ink is actually cured on the circuit board and the solvent is removed and legend inks wherein 100% of the material is cured on the board. The present state of the art of both these type inks have serious drawbacks. For example, in the solvent type legend ink the material has a tendency to dry out (evaporation of solvent) on the screen when being printed on the board, thus resulting in a clogging of the screen in subsequent applications with resultant non-uniform laydown. Further, the evaporation of the solvent causes pollution problems. A further problem due to evaporation of the solvent is the change in viscosity causing the ink to become thicker which also results in non-uniformity. Obviously, a further drawback is that, due to solvent evaporation, the thickness you print is not the thickness you get. The solvent type legend inks also are cured by heat. This usually requires removing the boards from the line, racking them and passing them to ovens wherein they remain for several hours to obtain a cure. Thus, not only is more energy consumed but also line speeds are decreased due to the necessity of racking and oven-curing for extended times.

The soldering of electrical components to a printed circuit board is a multi-step, time consuming task. More precisely, before the electrical components can be soldered to the board, the following steps are typically carried out. One starts with an insulating board such as epoxy fiberglass board which may or may not be copper-clad. The board is then drilled at predetermined sites where the land holes will be. The boards are then deburred and cleaned and, if clad, the cladding is washed in ammonium persulfate solution and then in water (5–10% $H_2SO_4$ solution) or other solvent to remove excess ammonium persulfate. A catalyst is then applied to the board for electroless deposition of copper to coat not only the inside of the drilled holes, but also the entire board. Following electroless deposition of copper, additional copper may be put on the board and in the holes by electroplating. The board is then covered with a photoresist and exposed imagewise through a printed circuit transparency to U.V. light, thus curing (hardening) the exposed portion of the photoresist. The unexposed portion of the photoresist is washed off, exposing the copper thereunder, i.e., where the lands, wiring conductors and connecting pads are formed in the case of "plated" boards. Positive working resists can also be used if desired at this stage. Alternatively, the board can be coated imagewise with a screenable resist via screen printing techniques, with the resist cured, either by heat in the case of "conventional" resists or by U.V. radiation in the case of photopolymer resists.

The thus exposed copper circuit can then be electroplated in a tin-lead plating bath, thereby coating solder onto the exposed copper on the board and in the holes. The cured photoresist is then stripped in a solvent and/or by mechanical means and the copper under the cured photoresist is etched away in a conventional copper etching bath.

Alternatively, the board can be plated with a combination of other metals, including nickel, gold, rhodium, etc.

As an alternative to the plated board, the "print and etch" variety of board is often used in entertainment circuitry. These boards are imaged with photoresist in the same manner, but in the negative image of the "plated" boards. The exposed copper represents superfluous copper outside of the land areas, wiring conductors and connector pads and can now be etched away. The resist is then removed.

All of these processes leave a printed wiring board ready for solder masking and legend ink marking. At this point, depending on the specific sequence in which the particular manufacturer of printed wiring boards operates, the solder mask can first be applied followed by legend ink application, or the reverse, or the legend ink only can be applied.

Normally, the boards are mechanically scrubbed in a machine such as a Somaca ® circuit board scrubber equipped with Scotchbrite ® scrubbing wheels and, subsequently, air-dried to provide a clean dust-free surface for both solder mask and legend ink adhesion. If the solder mask is to be applied first, it will normally be imaged via screenprinting. "Conventional" solder masks (usually epoxies or polyesters) are then cured via heat. U.V. curable solder masks (usually acrylates, epoxies or thiol-enes) may be cured with U.V. radiation. A dry film solder mask, which is laminated to the surface of the board, exposed imagewise through a photographic negative, developed and postcured via U.V. or I.R. radiation can also be employed.

The legend ink can be applied imagewise via screen printing through 100–355 mesh polyester or stainless steel screen and cured via U.V. light. The legend ink can be applied on the "back" or component side of the board or on the side to be soldered under or over the solder mask if used. Adhesion to any of the 16 common printed wiring board substrates (phenolic impregnated paper or epoxy glass) as well as to the metallization and the solder mask are all important as is high resistivity and good opacity at a thickness ranging from 0.8 mils (printed through 305 mesh polyester or 325 mesh stainless steel screen) to 2+ mils (printed through 110 mesh polyester).

The 100% solids (i.e., solvent-free) legend inks presently on the market afford higher line speeds than the solvent type legend ink but their opacity and adhesion to the board are often not of a commercially acceptable standard. That is, on standing the cured legend inks have a tendency to fade and peel off the board. They are not capable of being cured in thick enough sections to allow printing over high, closely spaced circuit board topography.

A commercially acceptable legend or marking ink should have the following qualities. It should be able to be applied at a sufficient line speed so that the operation of forming the soldered board will not be interrupted. Additionally, the cured legend ink should adhere well to the circuit board, have good moisture and humidity resistance and be poorly conductive since the legend inks can bridge circuits. Other very important characteristics of a cured commercially acceptable legend ink are that it should have excellent opacity and be able to cure to a thickness of at least 2 mils which thereby allows printing over a greater range of topography.

One object of the instant invention is to provide a screen-printable opaque legend ink composition which is curable on exposure to radiation. Another object of the instant invention is to provide a legend ink having good cure speed which does not cause interruption in the line speed of circuit boards to be soldered. Still another object of the instant invention is to provide a legend ink which adheres well to the printed circuit board. Yet another object of the invention is to provide a legend ink which is poorly conductive, has good moisture and humidity resistance and can be cured to a thickness of at least 2 mils thereby allowing printing over the wide range topography now present on modern day printed circuit boards. Still another object of the instant invention is to provide a legend ink of maximum opacity which is clearly readable against the background of the circuit board.

These and other objects are provided by a curable legend ink composition comprising (a) 15 to 40% by weight of an allyl terminated polyene which is the reaction product of an epoxide and an unsaturated amine, (b) 5 to 25% by weight of a cocurable allyl terminated polyene having a molecular weight of less than 500 selected from the group consisting of diallyl phthalate, triallyl isocyanurate, diallyl adipate, diallyl azelate, diallyl sebacate, diallyl itaconate, diallyl maleate, diallyl chlorendate, diallyl malate and triallyl cyanurate, (c) 15 to 45% by weight of a polythiol having a molecular weight in the range from about 94 to 20,000 of the general formula: $R_8$—$(SH)_n$ wherein $R_8$ is a polyvalent organic moiety free from reactive carbon-to-carbon unsaturation and n is at least 2 and (d) a pigment member of the group consisting of 0.5 to 25% by weight of zinc sulfide and 0.2 to 1.0% by weight of carbon black, said curable legend ink having a viscosity as measured on a Brookfield viscometer at 1 rpm using an RV7 spindle in the range 8,000 to 250,000 centipoises and a viscosity ratio at 1:10 rpm in the range 1.0 to 7.0.

Operable epoxy-amine polyenes herein have molecular weights in the range 50-20,000, preferably 100-10,000.

When photocuring by UV radiation as opposed to high energy ionizing radiation is employed, the composition also includes 0.05 to 15% by weight of the composition of a photoinitiator.

The 100% solids (i.e., solvent-free) legend ink composition of the instant invention, aside from its ability to be screen-printed, has excellent opacity and can be cured to sufficient depth as to allow printing over highly variable, closely spaced circuit board topography.

The allyl terminated polyene which is the reaction product of an epoxide and an unsaturated amine is formed by reacting an epoxide of the formula

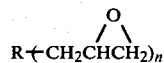

where n=1 or greater and R is an organic moiety containing 3 or more C atoms from the group consisting of alkyl, aryl, cycloalkyl and aralkyl, with an amine of the formula

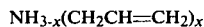

where x is 1 or 2 and the product of n times x is 2 or greater, to form a polyene of the formula

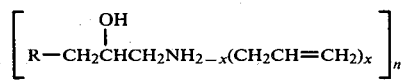

Examples of epoxides include the diglycidyl ether of Bisphenol A in either monomeric or oligomeric form, tris(epoxypropyl)isocyanurate, 1,4-butanediol diglycidyl ether, epoxy novolaks, epoxidized polyolefins and the like.

Examples of operable amines include allylamine and diallylamine.

Cocurable allylic polyenes operable in the instant invention are those having a molecular weight in the range of about 80 to 500 of the general formula:

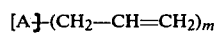

wherein m is at least 2 and A is a polyvalent organic moiety free of reactive carbon to carbon unsaturation. Thus A may contain cyclic groupings and minor amounts of hereto atoms such as N, S, P, Cl, Br or O but contains primarily carbon-to-carbon, carbon-oxygen or silicon-oxygen containing chain linkages without any reactive carbon-to-carbon unsaturation. These materials because of their low viscosity are added to the composition to reduce the viscosity and thereby allow the ink to be screen printable. Because of their reactivity they are cocured in the ink. Examples of low molecular weight, low viscosity, cocurable allylic polyenes operable herein include, but are not limited to, diallyl phthalate, triallyl isocyanurate, diallyl adipate, diallyl azelate, diallyl sebacate, dially itaconate, diallyl maleate, diallyl chlorendate, diallyl malate, triallyl cyanurate and the like.

Polythiols operable herein are simple or complex organic compounds having a multiplicity of pendant or terminally positioned —SH functional groups on each molecule.

The polythiol must contain 2 or more —SH groups/molecule and have a viscosity range of essentially 0 to 20 million centipoises (cps.) at 70° C. as measured by a Brookfield Viscometer either alone or when in the presence of an inert solvent, aqueous dispersion or plasticizer. Operable polythiols in the instant invention usually have molecular weights in the range about 94 to about 20,000 and preferably from about 100 to about 10,000.

The polythiols operable in the instant invention may be exemplified by the general formula $R_8$—$(SH)_n$ where n is at least 2 and $R_8$ is a polyvalent organic moiety free from reactive carbon-to-carbon unsaturation. Thus $R_8$ may contain cyclic groupings and hetero atoms such as N, P or O and primarily contains carbon-carbon, carbon-hydrogen, carbon-oxygen, or silicon-oxygen containing chain linkages free of any reactive carbon-to-carbon unsaturation.

One class of polythiols operable herein are esters of thiol-containing acids of the formula HS—$R_9$—COOH where $R_9$ is an organic moiety containing no reactive carbon-to-carbon unsaturation with polyhydroxy compounds of structure $R_{10}$—$(OH)_n$ where $R_{10}$ is an organic moiety containing no reactive carbon-to-carbon unsaturation, and n is 2 or greater. These components will react under suitable conditions to give a polythiol having the general structure:

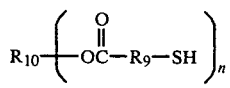

where $R_9$ and $R_{10}$ are organic moieties containing no reactive carbon-to-carbon unsaturation, and n is 2 or greater.

Polythiols such as the aliphatic monomeric polythiols (ethane dithiol, hexamethylene dithiol, decamethylene dithiol, tolylene-2,4-dithiol, and the like, and some polymeric polythiols such as a thiol-terminated ethylcyclohexyl dimercaptan polymer, and the like, and similar polythiols which are conveniently and ordinarily synthesized on a commercial basis, are operable herein. Examples of the polythiol compounds preferred include but are not limited to esters of thioglycolic acid (HS—CH$_2$COOH), α-mercaptopropionic acid (HS—CH(CH$_3$)—COOH and β-mercaptopropionic acid (HS—CH$_2$CH$_2$COOH) with polyhydroxy compounds such as glycols, triols, tetraols, pentaols, hexaols, and the like. Specific examples of the preferred polythiols include but are not limited to ethylene glycol bis(thioglycolate), ethylene glycol bis(β-mercaptopropionate), trimethylolpropane tris(thioglycolate), trimethylolpropane tris(β-mercaptopropionate), pentaerythritol tetrakis (thioglycolate) and pentaerythritol tetrakis (β-mercaptopropionate), all of which are commercially available. A specific example of a preferred polymeric polythiol is polypropylene ether glycol bis(β-mercaptopropionate) which is prepared from polypropylene-ether glycol (e.g. Pluracol P2010, Wyandotte Chemical Corp.) and β-mercaptopropionic acid by esterification.

Additionally, polythiol terminated polyoxyalkylene polyols, such as trimethylolpropane tris-(3-mercapto-2-hydroxypropyl-monooxypropyl) ether and trimethylolpropane tris-(3-mercapto-2-hydroxypropyl-dioxypropyl)ether, are operable. Furthermore, saturated alicyclic dithiols, such as 1,5-cyclooctanedithiol, 3,7,11-trimethyl-1,5-cyclododecanedithiol, 4-hexyl-1,2-cyclohexanedithiol, ethylcyclohexyl dithiol and d-limonene dithiol represent commercially available dithiols that are operable herein.

The curing reaction can be initiated by either UV radiation or high energy ionizing radiation. The UV radiation can be obtained from sunlight or special light sources which emit significant amounts of UV light having a wavelength in the range of about 2000 to about 4000 Angstrom units. When UV radiation is used for the curing reaction, a dose of 0.0004 to 60 watts/centimeter$^2$ is employed.

When U.V. radiation is used for curing, a photoinitiator is added to the composition to increase the photopolymerization or photocuring reaction rate. Various photoinitiators and coinitiators are operable and well known to those skilled in the art. Examples of photoinitiators include, but are not limited to, valerophenone, acetophenone, dibenzosuberone, 4-aminobenzophenone, hexanophenone, α-tetralone, 9-fluorenone, thioxanthen-9-one, 7-H-benz[de]anthracene-7-one, 4,4'-bis(dimethylamino)benzophenone, o-methoxybenzophenone, triphenylphosphine, tri-o-tolylphosphine, benz[a]anthracene-7,12-dione, benzoin isopropyl ether, benzoin isobutyl ether, benzoin tetrahydropyranyl ether, 2,2-diethoxyacetophenone, 2,2-dimethoxy-2-phenylacetophenone, thixoanthrone, 3-methoxybenzophenone, 4-methoxybenzophenone, benzophenone, 4,4'-dimethoxybenzophenone, 4-methoxybenzaldehyde, 4-methoxyacetophenone, benzaldehyde, dibenzosuberone, ethyl benzoin ether, isobutyl benzoin ether, α,α-diethoxy-α-phenylacetophenone, α-methylolbenzoin methyl ether, α,α,α-trichloroacetophenone and 2,3-butanedione and mixtures thereof, which service to give greatly reduced exposure times and thereby, when used in conjunction with various forms of energetic radiation, yield very rapid, commercially practical time cycles by the practice of the instant invention. The photoinitiators are usually added in an amount ranging from 0.05 to 15% by weight.

As used herein, the term "polyene" means a material terminated with "reactive" allylic groups —CH$_2$—CH=CH$_2$ which will react under proper conditions as set forth herein with thiol groups to yield the thioether linkage

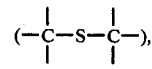

as contrasted with "unreactive" carbon-to-carbon unsaturation which means

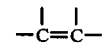

groups when found in aromatic nuclei (cyclic structures exemplified by enzene, pyridine, anthracene, and the like) which do not under the same conditions react with thiols to give thioether linkages. In the instant invention legend inks from the reaction of polyenes with polythiols which contain 2 or more thiol groups per average molecule are called polythioethers.

To obtain the maximum strength, solvent resistance, creep resistance, heat resistance and freedom from tackiness, the reactive components consisting of the polyenes, polythiol, pigment, photoinitiator and other optional additions are formulated in such a manner as to give a solid, crosslinked, three dimensional network polythioether on curing. In order to achieve such infinite network formation, the individual polyenes and polythiols must each have a functionality of at least 2 and at least 1 polyene or polythiol must have a functionality greater than 2.

In addition to the essential components of the curable composition of the invention set forth above, additional materials may be added in order to obtain the necessary properties for a legend ink. These are listed in Table I below in their respective proportions by weight.

TABLE I

| Component | Broadly % by Wt. | Preferably % by Wt. |
| --- | --- | --- |
| Inhibitors | .01–1 | .05–0.2 |
| Fillers | 30–70 | 45–55 |
| Thixotropic Agent | 0–4.0 | 0–2.0 |
| Levelling Agent | 0.05–2.0 | 0.1–1 |
| Coinitiators | 0.05–1.5 | 0.05–0.2 |

The choice of the materials and the amounts used may be readily determined by those skilled in the art.

The cured legend ink of the invention has good resistance to solvents and to high temperatures as well as possessing excellent dielectric properties, adhesion and good flexibility after curing.

Thermal polymerization inhibitors are generally also present in the preferred compositions. These materials act as antioxidants and stabilizers and include p-methoxyphenol, hydroquinone and alkyl and aryl-substituted hydroquinones and quinones, tert-butyl catechol, pyrogallol, octadecyl-$\beta$-(4-hydroxy-3,5-di-t-butyl phenyl)-propionate; 2,6-di-tert, -butyl-4-methyl phenol, phosphorous acid, beta-naphthol, 2,6 di-tert-butyl p-cresol, 2,2-methylenebis(4-ethyl-6-t-butylphenol), p-toluquinone, aryl and aralkyl phosphites.

Since it is necessary that the composition of the invention has the proper viscosity and thixotropic properties in order to be screen-printable, thixotropic agents and leveling agents are usually added to achieve a viscosity of from 8,000 to 250,000 centipoises and a thixotropic index of from 1.0 to 7.0.

The thixotropic agents which may be used are well known to those skilled in the art and include, but are not limited to, the aluminum, calcium and zinc salts of fatty acids, such as lauric or stearic acid, e.g., Zinc Soap No. 26 (trademark of the Witco Chemical Co., Inc.); and fumed silicas such as Cab-o-Sil and Santocel (trademarks of the Cabot Corporation and Monsanto Corporation, respectively).

The leveling agents which may be used include a copolymer of 2-ethylhexyl acrylate and ethyl acrylate sold under the tradename Modaflow and Multiflow by the Monsanto Company for resin modifiers. Other leveling agents include aluminum stearate, calcium stearate, sucrose benzoate and nonionic surface active agents.

Other ingredients may also be added to the coatings of the invention. These include additional pigments and fillers. Those skilled in the art may readily determine the amount of such materials desirable.

Commonly used fillers are barium sulfate, talc, calcium carbonate, zinc oxide, silicas, silicates and aluminas.

In practicing the process of the invention, any of the well known screen printing techniques may be employed. The photocurable ink is applied by pouring a measured quantity on the screen. A squeegee is drawn across the entire surface of the imaged screen, thereby transferring the ink to the substrate below. The screen is then lifted and the wet substrate removed and exposed to a radiation source. Film thicknesses ranging up to 2+ mils are obtained by this procedure.

U.V. radiation sources include carbon arcs, mercury vapor lamps, fluorescent lamps with ultraviolet radiation-emitting phosphors, argon glow lamps, electronic flash units and photographic flood lamps. Of these, the medium pressure mercury vapor lamps are the most suitable. The period of exposure, as will be readily understood by those skilled in the art, will be dependent on the film thickness, the light intensity, the distance from the light source to the ink and the temperature of the operation. A typical exposure time using a 200 watt per linear inch medium pressure mercury vapor lamp at a distance of 4 inches is about 5 seconds. After the exposure the ink is completely cured and may be passed directly to the next processing step.

The radiation curable legend ink compositions of the instant invention can also be cured by high energy ionizing irradiation. A preferred feature of the ionizing irradiation operation of the instant invention is treatment with high energy particle irradiation or by gamma-rays or X-rays. Irradiation employing particles in the instant invention includes the use of positive ions (e.g., protons, alpha particles and deuterons), electrons or neutrons. The charged particles may be accelerated to high speeds by means of various voltage gradient mechanisms such as a Van de Graaff generator, a cyclotron, a Cockroft Walton accelerator, a resonant cavity accelerator, a betatron, a G.E. resonant transformer, a synchrotron or the like. Furthermore, particle irradiation may also be supplied from radioactive isotopes or an atomic pile. Gamma rays or X-rays may be obtained from radioisotopes (e.g., cobalt 60) or by particle bombardment of suitable target material (e.g., high energy electrons on a gold metal target).

The dose rate for the irradiation operable to cure the coating in the instant invention is in the range 0.00001 to 1000 megarads/second.

The amount of ionizing radiation which is employed in curing the radiation curable material in the instant invention can vary between broad limits. Radiation dosages of less than a megarad up to 10 megarads or more for electrons are operable, preferably 0.02 to 5 megarads energy absorbed are employed. For gamma-rays or X-rays, radiation dosages in the range 0.0001 to 5.0 megarads energy absorbed are operable. The irradiation step is ordinarily performed under ambient temperature conditions but can be performed at temperatures ranging from below room temperature up to temperatures of 90° C.

The following examples are set out to explain, but expressly not limit, the instant invention. Unless otherwise noted, all parts and percentages are by weight.

EXAMPLE 1

To a 5 liter round bottom flask equipped with stirrer, thermometer, Graham (coil) condenser and dropping funnel was charged 1164 g of redistilled, commercially available diallylamine. The flask was flushed with nitrogen and kept under a nitrogen blanket during the reaction. The flask was heated to 80° C. with stirring and 1940 g of a Bis-phenol A diglycidyl ether type epoxy resin, commercially available from Shell Chemical Co. under the tradename "EPON 828" was slowly added to the flask by means of the dropping funnel over a 2 hour period while the flask was maintained at a temperature of 80°–90° C. After the addition was complete, stirring and heating at 80°–90° C. were continued for 4 hours. The excess diallylamine (194 g) was vacuum-stripped at 90° C. and 1–10 mm Hg. The epoxy tetra-ene product, i.e.,

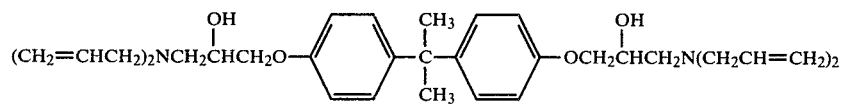

obtained amounted to 2910 g and will be referred to hereinafter as Prepolymer A.

EXAMPLE 2

A photocurable, screen-printable legend ink composition was prepared by mixing the following components:

TABLE II

| Components | Parts by Weight |
| --- | --- |
| Prepolymer A from Example 1 | 40 |
| Triallyl cyanurate | 20 |
| Pentaerythritol tetrakis (β-mercapto-propionate) | 40 |
| Benzoin tetrahydropyranyl ether | 5 |
| Zinc sulfide (pigment) | 22 |
| Alumina (filler) | 115 |
| Fumed silica (thixotropic agent) | 1.22 |
| Modaflow (leveling agent) | .25 |
| Triphenylphosphine | .20 |
| Stabilizers - | |
| pyrogallol | .10 |
| phosphorous acid | .02 |

The resulting composition has a viscosity of 168,000 cps at a Brookfield RVT spindle speed of 1 rpm and a viscosity ratio at 1:10 rpm of 2.71.

A copper clad epoxy fiberglass printed circuit board having an etched conductive pattern was used as the test panel. The panel was placed under an imaged monofilament polyester (280 mesh) screen tautly stretched on a frame. The photocurable composition was poured onto the screen, and the composition was screen-printed onto the test panel with a squeegee using methods well known to those skilled in the art. The photocurable composition was thus applied at thicknesses ranging from 0.3 to 2.5 mils depending on screen mesh and topography of the printed wiring board. After the application of the photocurable composition the screen was removed, and the substrate containing the liquid photocurable coating was exposed for 6 seconds to a 200 watt per linear inch medium pressure mercury vapor lamp at a distance of 4 inches. The thus exposed printed legend ink was completely hardened and could not be manually scratched or chipped. The panel was then wave-soldered at 500° F. on a wave-soldering machine manufactured by Hollis Inc. In the first stage the panel was treated with flux to prepare the exposed copper for excellent solder adhesion, preheated to drive off the flux solvents and activate the flux. Thereafter, the panel was subjected to wave-soldering wherein the inverted board is passed over a 7 inch wide wave at a conveyor speed of 36 inches per minute to deposit a uniform layer of solder upon the exposed copper surfaces and in the through-hole connections. The panel was then cooled, treated with a flux removing solvent, e.g., trichloroethane and dried. Examination of the panel showed that the cured legend ink remained intact and exhibited good adhesion and hardness.

EXAMPLE 3

Example 2 was repeated except that a black legend ink of the composition set out in TABLE III was employed:

TABLE III

| Components | Parts by Weight |
| --- | --- |
| Prepolymer A from Example 1 | 35.0 |
| Triallyl cyanurate | 20.0 |
| Pentaerythritol tetrakis (β-mercaptopropionate) | 40.0 |
| Cabot Mogul L Carbon Black | 0.90 |
| 2,2-dimethoxy-2-phenylacetophenone | 5.0 |
| Alumina filler | 115.0 |

TABLE III-continued

| Components | Parts by Weight |
| --- | --- |
| Modaflow leveling agent | 0.25 |
| Triphenylphosphine | 0.20 |
| Stabilizers - | |
| pyrogallol | 0.10 |
| phosphorous acid | 0.02 |

The resulting composition has a viscosity of 60,000 cps at a Brookfield RV7 spindle speed of 1 rpm and a viscosity ratio at 1:10 rpm of 1.11.

The cured legend ink after wave-soldering remained intact and exhibited excellent adhesion and hardness.

EXAMPLE 4

A curable screen printable legend ink composition was prepared by mixing the following components:

TABLE IV

| Components | Parts by Weight |
| --- | --- |
| Prepolymer A from Example 1 | 98.5 |
| Triallyl cyanurate | 49.2 |
| Pentaerythritol tetrakis (β-mercapto-propionate) | 98.5 |
| Zinc sulfide (pigment) | 54.1 |
| Alumina (filler) | 283.0 |
| Fumed silica (thixotropic agent) | 3.0 |
| Modaflow (leveling agent) | 0.62 |
| Triphenylphospine | 0.49 |
| Stabilizers - | |
| pyrogallol | 0.25 |
| phosphorous acid | 0.05 |

Copper clad epoxy fiberglass printed wiring boards having an etched conductive pattern were used as the test panels. Each panel was placed under one of two imaged monofilament polyester (230 or 110 mesh) screens tautly stretched on a frame separately. The photocurable composition was poured onto the screens and the composition was screen-printed onto each test panel with a squeegee. The photocurable composition on the panels had a thickness ranging from 0.4–2.5 mils depending on topography of the printed wiring board. After the application of the photocurable composition the screen was removed and the panel containing the liquid radiation curable coating was passed by conveyer belt under the electron beam of an Energy Science's CB-150 "Electrocurtain" having a terminal voltage of 160 kilovolts. The conveyer belt was adjusted to travel at a rate of 18 feet/minute. The composition was exposed to a total dosage of 5 Mrads in air. The thus exposed printed legend ink was completely hardened and could not be manually scratched or chipped. The panel was then wave-soldered at 500° F. on a wave-soldering machine manufactured by Hollis Inc. In the first stage the panel was treated with flux to prepare the exposed copper for solder adhesion and then preheated to drive off the flux solvents and activate the flux. Thereafter, the panel was subjected to wave-soldering wherein the inverted board was passed over a 7 inch wide wave at a conveyer speed of 36 inches per minute to deposit a uniform layer of solder upon the exposed copper surfaces. The panel was then cooled, treated with a flux removing solvent, e.g., trichloroethane and dried. Examination of the panels in all cases showed that the cured legend ink remained intact and exhibited good adhesion and hardness.

The example was repeated except that the exposure was done under nitrogen. The results were the same.

The example was repeated in air except that the composition was as follows:

TABLE V

| Components | Parts by Weight |
|---|---|
| Prepolymer A from Example 1 | 40 |
| Triallyl cyanurate | 20 |
| Pentaerythritol tetrakis ($\beta$-mercaptopropionate) | 40 |
| Benzoin tetrahydropyranyl ether | 5 |
| Zinc sulfide (pigment) | 22 |
| Alumina (filler) | 115 |
| Fumed silica (thixotropic agent) | 1.22 |
| Modaflow (leveling agent) | .25 |
| Triphenylphosphine | .20 |
| Stabilizers - | |
| pyrogallol | .10 |
| phosphorous acid | .02 |

The resulting composition has a viscosity of 168,000 cps at a Brookfield RV7 spindle speed of 1 rpm and a viscosity ratio of 1:10 rpm of 2.71.

The cured legend ink after wave-soldering remained intact and exhibited excellent adhesion and hardness.

EXAMPLE 5

A curable screen printable legend ink composition was prepared by mixing the following components:

TABLE VI

| Components | Parts by Weight |
|---|---|
| Prepolymer A from Example 1 | 97.0 |
| Triallyl cyanurate | 55.4 |
| Pentaerythritol tetrakis ($\beta$-mercaptopropionate) | 110.8 |
| Cabot Mogul L Carbon Black | 2.4 |
| Alumina filler | 318.8 |
| Modaflow leveling agent | 0.69 |
| Triphenylphosphine | 0.55 |
| Stabilizers - | |
| pyrogallol | 0.28 |
| phosphorous acid | 0.05 |

Copper clad epoxy fiberglass printed wiring boards having an etched conductive pattern was used as the test panels. Each panel was placed under one of two imaged monofilament polyester (230 or 110 mesh) screens tautly stretched on a separate frame. The photocurable composition was poured onto the screens, and the composition was screen-printed onto each test panel with a squeegee. The photocurable composition on the panels had a thickness ranging from 0.4-2.5 mils depending on topography of the printed wiring board. After the application of the photocurable composition the screen was removed and the panel containing the liquid radiation curable coating was passed by conveyer belt under the electron beam of an Energy Science's CB-150 "Electrocurtain" having a terminal voltage of 160 kilovolts. The conveyer belt was adjusted to travel at a rate of 18 feet/minute. The composition was exposed to a total dosage of 5 Mrads in air. The thus exposed printed legend ink was completely hardened and could not be manually scratched or chipped. The panel was then wave-soldered at 500° F. on a wave-soldering machine manufactured by Hollis Inc. In the first stage the panel was treated with flux to prepare the exposed copper for solder adhesion and then preheated to drive off the flux solvents and activate the flux. Thereafter, the panel was subjected to wave-soldering wherein the inverted board was passed over a 7 inch wide wave at a conveyer speed of 36 inches per minute to deposit a uniform layer of solder upon the exposed copper surfaces. The panel was then cooled, treated with a flux removing solvent, e.g., trichloroethane and dried. Examination of the panels in all cases showed that the cured legend ink remained intact and exhibited good adhesion and hardness.

The example was repeated except that the exposure was done under nitrogen. The results were the same.

The example was repeated in air except that the composition was as follows:

TABLE VII

| Components | Parts by weight |
|---|---|
| Prepolymer A from Example 1 | 35.0 |
| Triallyl cyanurate | 20.0 |
| Pentaerythritol tetrakis ($\beta$-mercaptopropionate) | 40.0 |
| Cabot Mogul L Carbon Black | 0.90 |
| 2,2-dimethoxy-2-phenylacetophenone | 5.0 |
| Alumina filler | 115.0 |
| Modaflow leveling agent | 0.25 |
| Triphenylphosphine | 0.20 |
| Stabilizers - | |
| pyrogallol | 0.10 |
| phosphorous acid | 0.02 |

The resulting composition has a viscosity of 60,000 cps at a Brookfield RV7 spindle speed of 1 rpm and a viscosity ratio at 1/10 rpm of 1.11.

The cured legend ink after wave-soldering remained intact and exhibited excellent adhesion and hardness.

We claim:

1. A radiation curable screen printable opaque legend ink which comprises
   (a) 15 to 40% by weight of an allyl terminated polyene which is the reaction product of an epoxide and an unsaturated amine,
   (b) 5 to 25% by weight of a cocurable allyl terminated polyene having a molecular weight of less than 500 selected from the group consisting of diallyl phthalate, triallyl isocyanurate, diallyl adipate, diallyl azelate, diallyl sebacate, diallyl itaconate, diallyl maleate, diallyl chlorendate, diallyl malate and triallyl cyanurate,
   (c) 15 to 45% by weight of a polythiol having a molecular weight in the range from about 94 to 20,000 of the general formula: $R_8\text{-(SH)}_n$ wherein $R_8$ is a polyvalent organic moiety free from reactive carbon-to-carbon unsaturation and n is at least 2 and
   (d) a pigment member of the group consisting of 0.5 to 25% by weight of zinc sulfide and 0.2 to 1.0% by weight of carbon black, said curable legend ink having a viscosity as measured on a Brookfield viscometer at 1 rpm using an RV7 spindle in the range 8,000 to 250,000 centipoises and a viscosity ratio at 1:10 rpm in the range 1.0 to 7.0.

2. The ink of claim 1 containing in addition 0.05 to 15% by weight of the composition of a photoinitiator.

3. A radiation curable screen printable opaque legend ink which comprises
   (a) 15 to 40% by weight of an allyl terminated polyene of the formula:

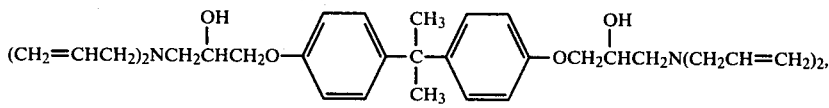

(b) 5 to 25% by weight of triallyl cyanurate,
(c) 15 to 45% by weight of a polythiol having a molecular weight in the range from about 94 to 20,000 of the general formula: $R_8$—$SH)_n$ wherein $R_8$ is a polyvalent organic moiety free from reactive carbon-to-carbon unsaturation and n is at least 2 and
(d) 0.5 to 25% by weight of zinc sulfide pigment, said legend ink having a viscosity as measured on a Brookfield viscometer at 1 rpm using an RV7 spindle in the range 8,000 to 250,000 centipoises and a viscosity ratio at 1:10 rpm in the range 1.0 to 7.0.

4. The ink of claim 3 containing in addition 0.05 to 15% by weight of the composition of a photoinitiator.

5. A radiation curable screen printable opaque legend ink which comprises (a) 15 to 40% by weight of an allyl terminated polyene of the formula:

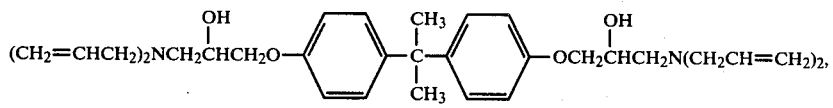

(b) 5 to 25% by weight of triallyl cyanurate,
(c) 15 to 45% by weight of a polythiol having a molecular weight in the range from about 94 to 20,000 of the general formula: $R_8$—$SH)_n$ wherein $R_8$ is a polyvalent organic moiety free from reactive carbon-to-carbon unsaturation and n is at least 2, and
(d) 0.2 to 1.0% by weight of carbon black, said legend ink having a viscosity as measured on a Brookfield viscometer at 1 rpm using an RV7 spindle in the range 8,000 to 250,000 centipoises and a viscosity ratio at 1:10 rpm in the range 1.0 to 7.0.

6. The ink of claim 5 containing in addition 0.05 to 15% by weight of the composition of a photoinitiator.

* * * * *